No. 669,292. Patented Mar. 5, 1901.
J. B. TOUGAS.
MOWING MACHINE.
(Application filed May 1, 1900.)
(No Model.)
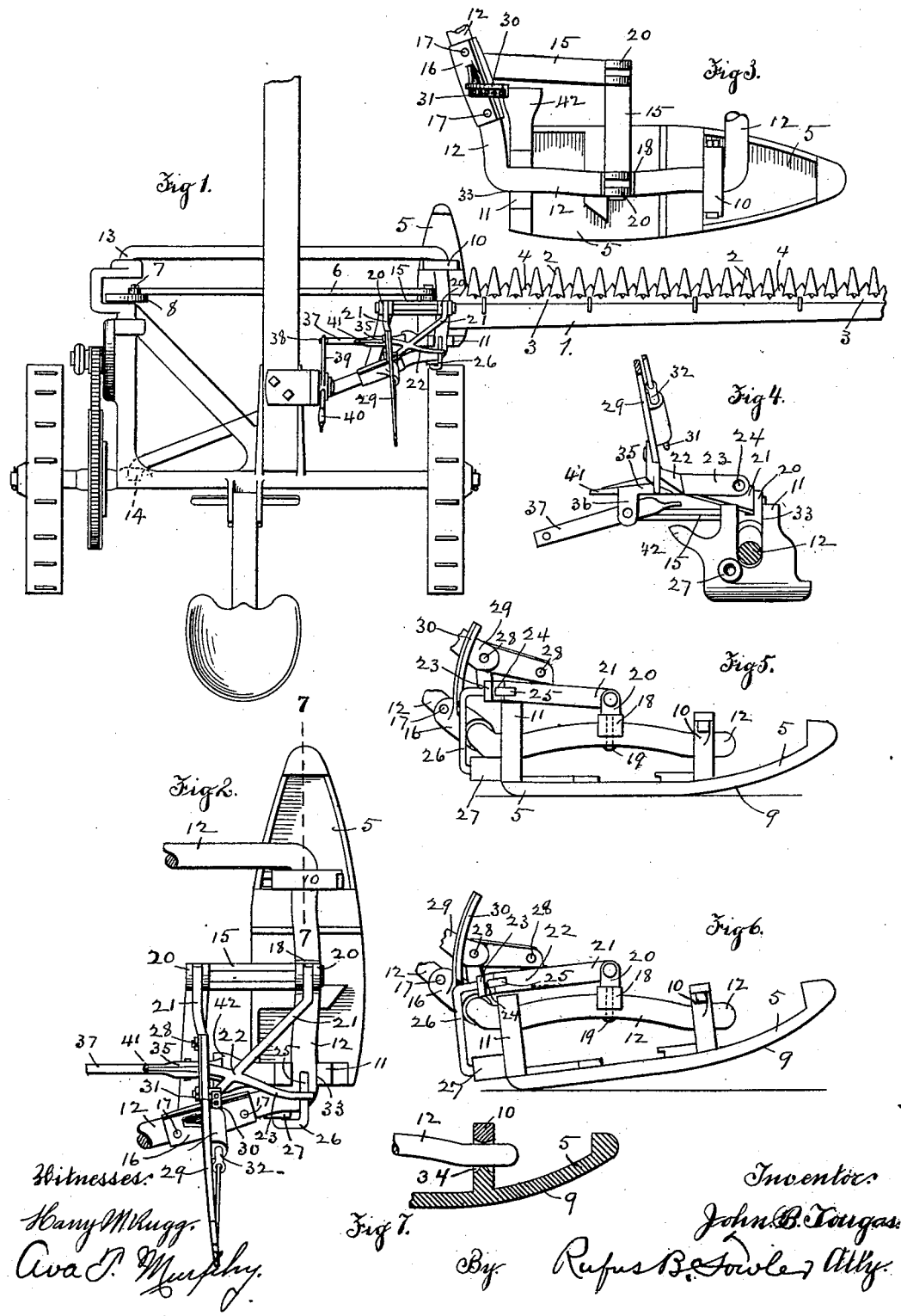

UNITED STATES PATENT OFFICE.

JOHN B. TOUGAS, OF WORCESTER, MASSACHUSETTS.

MOWING-MACHINE.

SPECIFICATION forming part of Letters Patent No. 669,292, dated March 5, 1901.

Application filed May 1, 1900. Serial No. 15,084. No model.

*To all whom it may concern:*

Be it known that I, JOHN B. TOUGAS, a citizen of the United States, and a resident of Worcester, in the county of Worcester and Commonwealth of Massachusetts, have invented certain new and useful Improvements in Mowing-Machines, of which the following is a specification, reference being had to the accompanying drawings, forming a part of the same, in which—

Figure 1 represents a top view of a mowing-machine embodying my invention. Fig. 2 is an enlarged view of a shoe supporting the inner end of a cutter-bar, together with a portion of the mechanism for operating the cutter-bar. Fig. 3 represents the same view as shown in Fig. 2, with a portion of the cutter-bar-operating mechanism removed. Fig. 4 is a rear view. Fig. 5 is a side view of the same. Fig. 6 is a side view with the shoe tilted to raise the teeth of the cutter-bar; and Fig. 7 is a section on line 7 7, Fig. 2.

Similar reference-figures refer to similar parts in the different views.

My invention has for its object to provide a mechanism for manipulating the cutting apparatus of the mowing-machine by which the same may be tilted for the purpose of raising or lowering the cutting-teeth; and it consists in the construction and arrangement of parts as hereinafter described, and set forth in the annexed claims.

Referring to the accompanying drawings, 1 denotes the finger-bar of a mowing-machine, 2 the fingers, and 3 the reciprocating knife-blade, provided with cutting-teeth 4. The inner end of the finger-bar 1 is attached to a shoe 5, and the knife-blade 3 slides in ways in the usual manner in machines of this class and is actuated by a connecting-rod 6, crank-pin 7, and rotating crank-plate 8, driven from the main axle of the machine in the usual manner. The shoe 5 has a runner-shaped under surface 9, adapted to slide on the ground, and is provided on its upper surface with the upright posts 10 and 11, which receive a bail 12, pivotally connected at its ends 13 and 14 with the framework of the machine. Attached to the bail 12 is a frame 15, provided at one end with a sleeve 16, which incloses a portion of the bail and is attached thereto by bolts 17 and at the opposite end with a saddle 18, which is attached to the bail by a bolt 19. Projecting upwardly from the frame 15 are lugs 20 20, to which are pivoted the two arms 21 21 of a three-armed spider 22. The third arm 23 of the spider 22 is provided with a hole 24 to receive one end 25 of a link 26, having its opposite end entering a hole in a boss 27 at the rear of the shoe 5, thereby pivotally connecting the rear end of the shoe 5 with the arm 23 of the spider. Attached to the spider 22 by bolts 28 28 is a lever-handle 29, extending upwardly and rearwardly, in position to be operated by the attendant in order to rock the spider 22 in the lugs 20. Attached to the sleeve 16 is an arm or bracket 30, curved concentrically with the axis of the rocking spider 22 and provided with a series of holes 31, adapted to receive the tip $31^a$ of a sliding spring-actuated bolt 32, carried by the lever 29 in order to lock the pivoted spider 22 in any desired position. The bail 12 passes through a slot 33 in the rear post 11 and through a hole 34 in the front post 10, the hole 34 being enlarged at its outer ends to permit a slight rocking motion of the post 10 upon the bail 12. By raising the lever-handle 29 the spider 22 is rocked in the lugs 20, which are supported by the bail and lie in a plane midway between the posts 10 and 11, causing the rear end of the shoe to be lifted by means of the pivoted links 26, causing the rear post 11 to slide on the bail 12 and depress the forward end of the shoe, thereby rocking the shoe to carry the front or cutting edge of the cutter-bar downward. By depressing the lever-handle 29 the shoe is rocked on the bail 12 at the forward post 10, sliding the post 11 downwardly and raising the forward end of the shoe, as shown in Fig. 6, thereby tilting the cutting-bar so as to raise its forward or cutting edge. The spider 22 is provided with an arm 35, having downwardly-projecting lugs 36, in which is pivoted a lever 37, connected by a link 38 with a horizontal arm 39 of a bell-crank lever 40, pivoted on the framework of the machine and arranged to rock the lever 37 in the lugs 36 and carry it against the projecting end 41 of the arm 35. The opposite end of the lever 37 is arranged to strike the projecting arm 42 on the side of the shoe 5 simultaneously with its contact with the end 41 of the arm 35. As the lever 37 is then raised the shoe 5 and entire cutter-bar will be lifted and the contact of the lever 37 with the end 41 of the arm 35 and with the projecting arm 42 will hold the shoe 5 from rocking on the bail 12 by the weight of the cutter-bar, thereby causing the cutter-bar to be maintained in a level position while it is being raised by swinging the bail 12 at its pivoted ends 13 and 14.

It will be observed that the shoe 5 is capable of a rocking motion on the bail in two directions—first, a rocking motion about the bail 12, by which the outer end of the cutter-bar is raised or lowered, which is controlled by the lever 37 when brought into contact with the arms 35 and 42 in the operation of lifting the cutter-bar and shoe, and, second, a rocking motion of the post 10 on the bail 12, by which the shoe is rocked in the direction of its length in order to raise or lower the forward end of the shoe and tilt the cutter-bar, which is accomplished by rocking the shoe 5 to raise or depress the cutting-teeth by means of the lever-handle 29 and spider 22, which is pivoted in lugs 20, supported on the bail 12 and connected with the rear of the shoe by the link 26.

What I claim as my invention, and desire to secure by Letters Patent, is—

1. In a mowing-machine the combination of a bail pivoted on the framework of the machine, a spider supported on said bail, a shoe pivoted on said bail and capable of rocking thereon in the direction of its width, a lever pivoted on said spider and having its end projecting over said shoe, means for rocking said lever to bring its end into contact with said shoe and a projecting arm on said spider arranged to contact with said lever as it strikes said shoe, substantially as described.

2. The combination with the framework of a mowing-machine, of a bail pivoted at its ends to said framework, a shoe pivoted on said bail, a fixed frame supported on said bail above said shoe, a spider pivoted on said frame, means for locking said spider in position, a lever pivoted on said spider, a lifting mechanism attached to one end of said lever, an arm projecting from said shoe in the path of the opposite end of said lever, as it is rocked by the lifting mechanism and an arm projecting from said spider arranged to simultaneously contact with said lever and cause the shoe to be lifted, substantially as described.

3. In a mowing-machine, the combination of a bail pivoted to the framework of the machine, a shoe pivoted on said bail and capable of a rocking motion in the direction of its length, a saddle 18 and a sleeve 16 supported on said bail, a frame supported by said saddle and said sleeve, lugs projecting from said frame, a spider having arms pivoted in said lugs, an arm projecting from said spider, a link connecting said arm and said shoe, a lever-handle carried by said spider and means for locking said spider in a fixed position, substantially as described.

4. The combination with the framework of a mowing-machine, of a bail pivotally attached thereto, a shoe pivoted on said bail, a frame attached to said bail above said shoe, a spider pivoted on said frame, an arm 35 projecting from said spider, lugs 36 depending from said arm, a lever 37 pivoted in said lugs, means connected with one end of said lever to rock the same and carry it into contact with said arm 35 and an arm 42 projecting from the side of said shoe in the path of the opposite end of the lever 37, whereby said shoe is raised as the lever 37 is lifted, substantially as described.

In testimony whereof I have signed my name to this specification, in presence of two subscribing witnesses, this 25th day of April, 1900.

JOHN B. TOUGAS.

Witnesses:
RUFUS B. FOWLER,
AVA T. MURPHY.